United States Patent

Watanabe

[11] Patent Number: 5,083,266
[45] Date of Patent: Jan. 21, 1992

[54] MICROCOMPUTER WHICH ENTERS SLEEP MODE FOR A PREDETERMINED PERIOD OF TIME ON RESPONSE TO AN ACTIVITY OF AN INPUT/OUTPUT DEVICE

[75] Inventor: Minoru Watanabe, Tokyo, Japan

[73] Assignee: Kabushiki Kaisha Toshiba, Kawasaki, Japan

[21] Appl. No.: 137,667

[22] Filed: Dec. 24, 1987

[30] Foreign Application Priority Data

Dec. 26, 1986 [JP] Japan ................. 61-315325

[51] Int. Cl.⁵ ............................................. G06F 1/32
[52] U.S. Cl. ....................... 395/275; 364/273.5; 364/264; 364/707; 364/948.8; 364/DIG. 1; 364/DIG. 2
[58] Field of Search ............... 364/900 MS File, 707, 364/200 MS File; 455/343; 340/506; 365/228

[56] References Cited

U.S. PATENT DOCUMENTS

| | | | |
|---|---|---|---|
| 4,137,563 | 1/1979 | Tsuneda | 364/200 |
| 4,293,927 | 10/1981 | Hoshii | 364/900 |
| 4,317,180 | 2/1982 | Lies | 364/900 |
| 4,381,552 | 4/1983 | Nocilini et al. | 364/900 |
| 4,409,665 | 10/1983 | Tubbs | 364/900 |
| 4,545,030 | 10/1985 | Kitchin | 364/900 |
| 4,570,219 | 2/1986 | Shibukawa et al. | 364/200 |
| 4,590,553 | 5/1986 | Noda | 364/200 |
| 4,615,005 | 9/1986 | Maejima et al. | 364/200 |
| 4,665,536 | 5/1987 | Kim | 377/16 |
| 4,686,386 | 8/1987 | Tadao | 307/269 |
| 4,698,748 | 10/1987 | Juzswik et al. | 364/200 |
| 4,748,559 | 5/1988 | Smith et al. | 364/200 |
| 4,777,590 | 10/1988 | Durkos et al. | 364/200 |
| 4,780,843 | 10/1988 | Tietjen | 364/900 |
| 4,819,164 | 4/1989 | Branson | 364/200 |
| 4,819,237 | 4/1989 | Hamilton | 364/900 |

Primary Examiner—Thomas C. Lee
Assistant Examiner—Eric Coleman
Attorney, Agent, or Firm—Cushman, Darby & Cushman

[57] ABSTRACT

When information from input/output devices is requested by application software, a timer sets a predetermined sleep time period, and when the sleep time period expires, it is checked whether the information has been obtained. The sleep time period is suitably set in consideration of the response speed of the input/output devices and the influence of the delay on the processing. Accordingly, the sleep mode is entered while waiting for an input/output response, thus reducing electric power consumption.

16 Claims, 8 Drawing Sheets

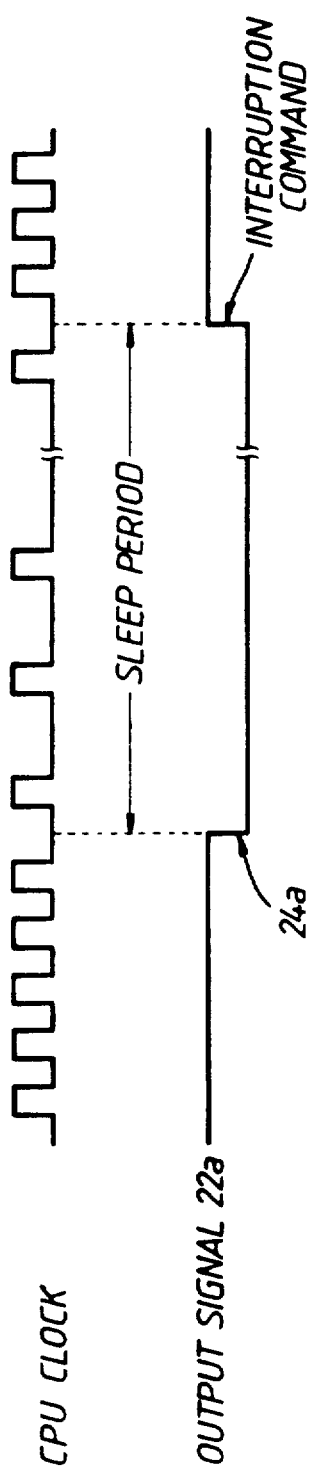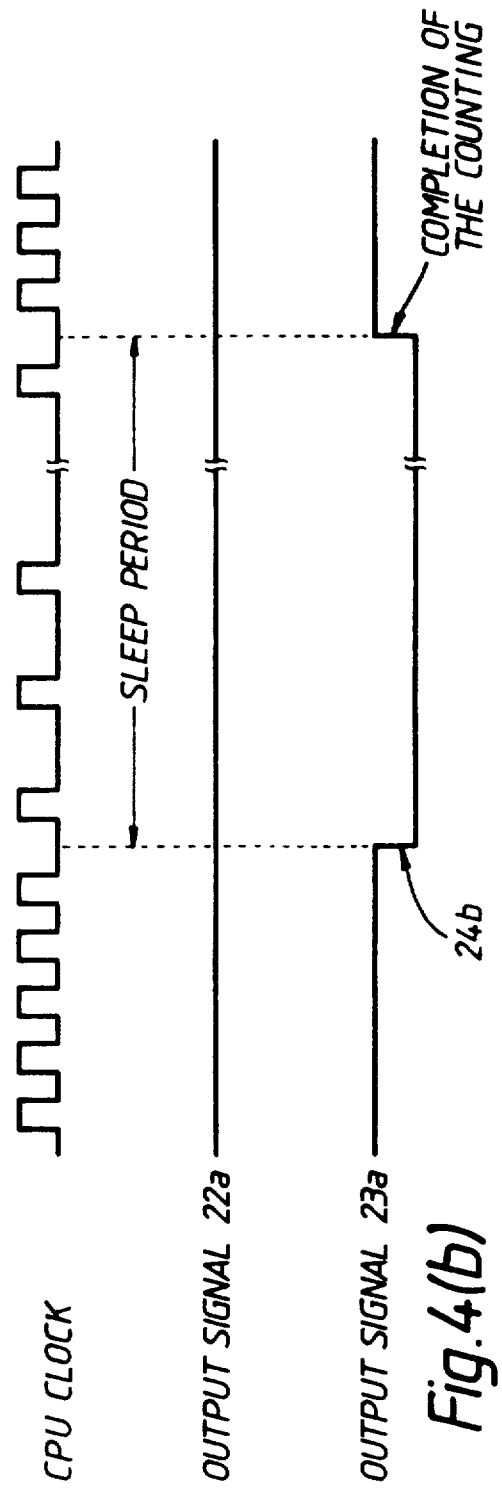

MICROCOMPUTER WHICH ENTERS SLEEP MODE FOR A PREDETERMINED PERIOD OF TIME ON RESPONSE TO AN ACTIVITY OF AN INPUT/OUTPUT DEVICE

BACKGROUND OF THE INVENTION

The present invention relates to a portable machine capable of being driven by a battery, and in particular, to a microcomputer system having a sleep function whereby the operation of sections which are not necessary for an ongoing operation is suspended, thus saving electric power.

Recently, portable personal computers and word processors have been marketed which can be operated anywhere with batteries. In such battery-powered devices, reducing consumed electric power increases operation time. To decrease the consumed electric power, various features have been employed. One of these is a sleep function which saves electric power by suspending the operation of the sections which are not related to the ongoing operation. Compared to the operation speed of a CPU, that of a keyboard, floppy-disc drive, or printer is low. Accordingly, while the CPU and its peripheral circuits await input/output responses from the keyboard, floppy-disc drive, and printer, the clock of the CPU and its peripheral circuits may be suspended, or the speed of the clock may be lowered. Low power consumption is realized by switching the clock of the CPU and its peripheral circuits to the sleep mode. The sleep function takes advantage of the fact that many CPU integrated circuits have a C-MOS structure. A C-MOS IC consumes electric power in proportion to its clock rate.

The operation of a conventional system of the above-mentioned type will now be described. FIG. 6 shows a basic input/output service (BIOS) routine that is part of the operating system of a conventional microprocessor system. A CPU and its peripheral circuits are put in the sleep state until the input/output devices supply input signals to the CPU. In step 60, if an input signal is not supplied from the input/output device, the routine goes to step 61. In step 61, the CPU executes a sleep mode command, to suspend the clock of the CPU and its peripheral circuits. The return from the sleep mode is effected by a hardware-type interrupt. If an input signal is supplied from the input/output device in step 60, or if an interrupt instruction is given from the input/output device, the routine goes to step 62 to perform a data input/output operation.

As shown in FIG. 8(a), the conventional application program waits for the input/output by executing the basic input/output service routine of FIG. 6. However, in recent application programs, other processing is performed at the time of waiting the input from the input/output device, as shown in FIG. 8(b). This operation in the application program requires the provision of a routine in BIOS for checking a response from an input/output device. Such a BIOS status routine is shown in FIG. 7, in which the presence/absence of an input signal from the input/output device is checked. When an input signal is supplied in step 70, a flag is set in step 72. This flag is located at a predetermined internal register of the CPU or work area of a system memory. When an input signal is not supplied from the input/output device, the flag is cleared in step 71.

The application program shown in FIG. 8(b) will now be described. Step 81 examines for a response from the input/output device by performing the status routine of FIG. 7. Step 82 checks the state of the flag. If the flag is cleared, step 83 performs other processing. If the flag is set in step 82, the routine goes to step 84. In step 84, the basic input/output service routine of FIG. 6 is executed.

In the application program of FIG. 8(b), in the absence of the input signal from the input/output device, the flag is cleared in step 71 of FIG. 7. Accordingly, other processing is performed in step 83 of FIG. 8(b). Furthermore, in the presence of the input signal from the input/output device, the flag is set in step 72 of FIG. 7. Accordingly, the basic input/output routine of FIG. 6 is executed in step 84 of FIG. 8(b). Since the presence of an input signal from the input/output device is checked in step 60 of FIG. 6, the routine goes to step 62 to perform the data input/output. The application program of FIG. 8(b) performs the input/output routine of FIG. 6 only when a response is detected. Thus, if the application program shown in FIG. 8(b) is employed, the sleep mode of FIG. 6 cannot be effectively used.

SUMMARY OF THE INVENTION

The object of the present invention is to provide a microcomputer system which can reduce electric power consumption.

In order to achieve this object, there is provided a microcomputer system, comprising:

processing means responsive to clock signals, for supplying a sleep mode execution command when there occurs a time period for waiting for a response from an input/output device during execution of current processing; and timing control means for executing a sleep mode for a predetermined period of time in response to said sleep mode execution command from said processing means, wherein a rate of said clock signals for said processing means is changed during said sleep mode, said processing means also checking whether or not a response from the input/output device exists, after said timing control means completes the sleep mode.

BRIEF DESCRIPTION OF THE DRAWINGS

Other objects and features of the present invention will be apparent from the following description given with reference to the accompanying drawings, in which:

FIGS. 4(a), and 4(b) are timing diagrams for the timing control circuit 10 of FIG. 2(b);

DETAILED DESCRIPTION OF THE PREFERRED EMBODIMENT

Figure 1:
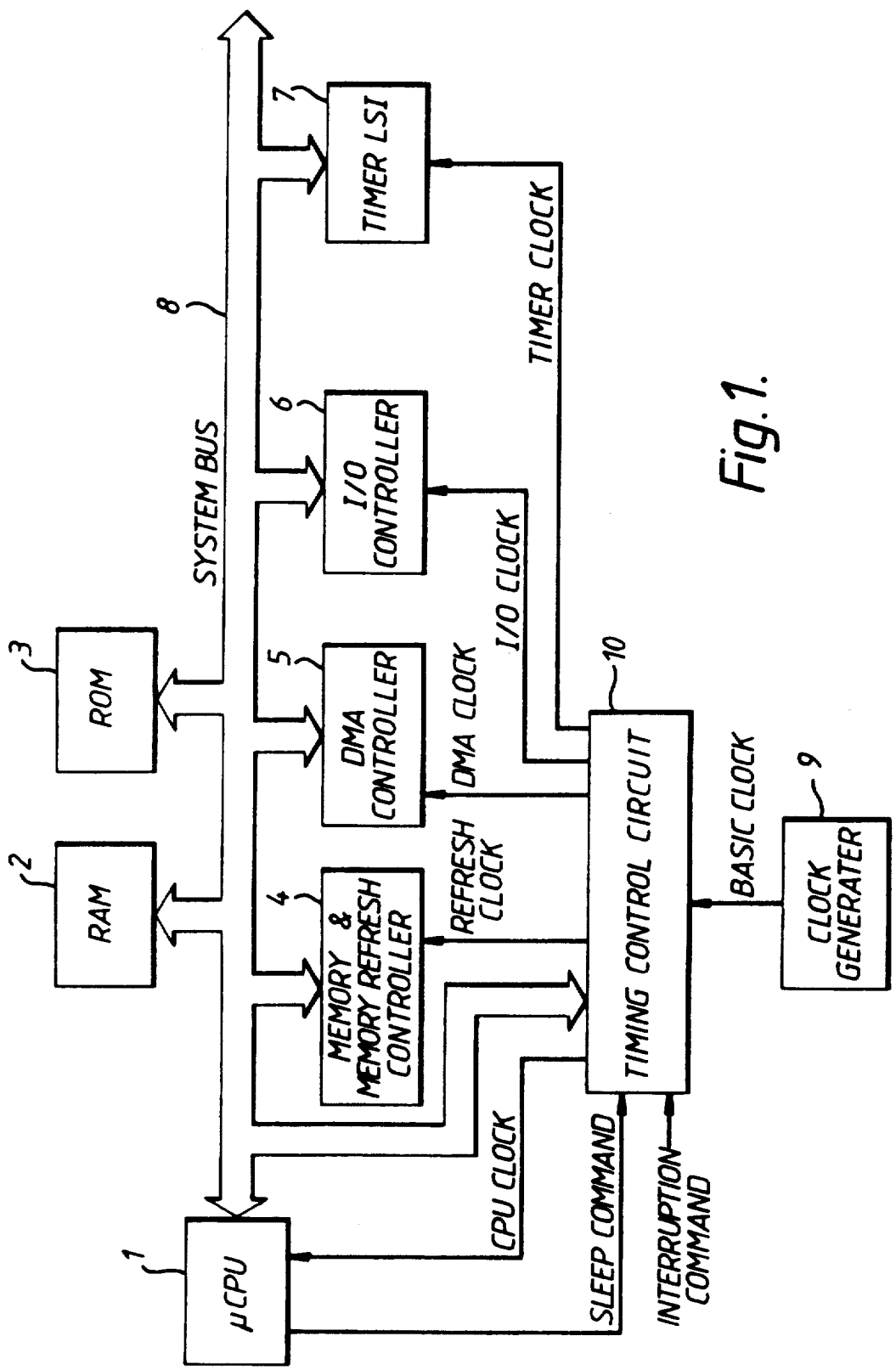
FIG. 1 is a block diagram showing an entire structure of a microcomputer system according to an embodiment of the present invention.

An embodiment of the present invention will now be described with reference to the accompanying drawings. FIG. 1 is a block diagram showing this embodiment. Microprocessor 1 (hereinafter referred to as "CPU"), which serves as a main control section of the system, controls peripheral devices connected to the system, based on a program stored in RAM 2 and ROM 3. The peripheral devices include memory and memory refresh controller 4, DMA controller 5, input/output device controller 6, and timer 7. Input/output device controller 6 includes a serial I/O controller (SIO), a printer I/O controller, a disc I/O controller, and a display I/O controller. CPU 1, RAM 2, ROM 3, memory and memory refresh controller 4, DMA controller 5, input/output device controller 6, timing control circuit 10 and timer 7 are commonly connected to system bus 8.

Clock generator 9 supplies a basic clock signal to timing control circuit 10. Timing control circuit 10 receives the basic clock signal and generates various timing signals for operating CPU 1, memory and memory refresh controller 4, DMA controller 5, input/output device controller 6, and timer 7. These timing signals are called a CPU clock signal, a refresh clock signal, a DMA clock signal, an input/output clock signal, and a timer clock signal, respectively. Timing control circuit 10 has an internal circuit for stopping clock signals to the above-mentioned peripheral circuits when timing control circuit 10 receives a sleep command from CPU 1. The construction of this internal circuit of timing control circuit 10 will now be described in greater detail with reference to FIG. 2(a) and FIG. 2(b).

Figure 2A:
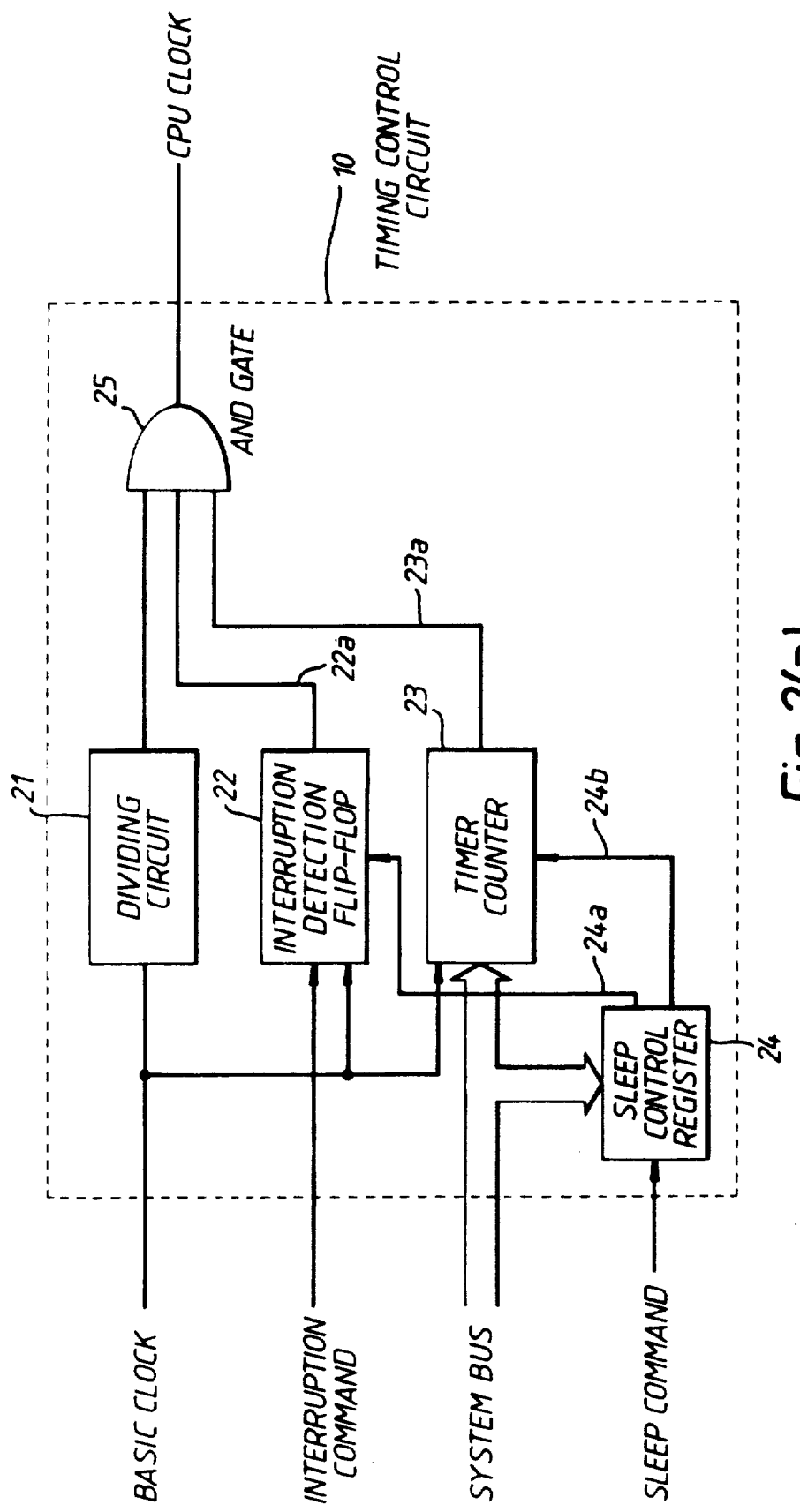
FIGS. 2(a) and 2(b) are block diagrams showing a detailed structure of a timing control circuit 10 of the microcomputer system shown in FIG. 1.
Figure 3A:
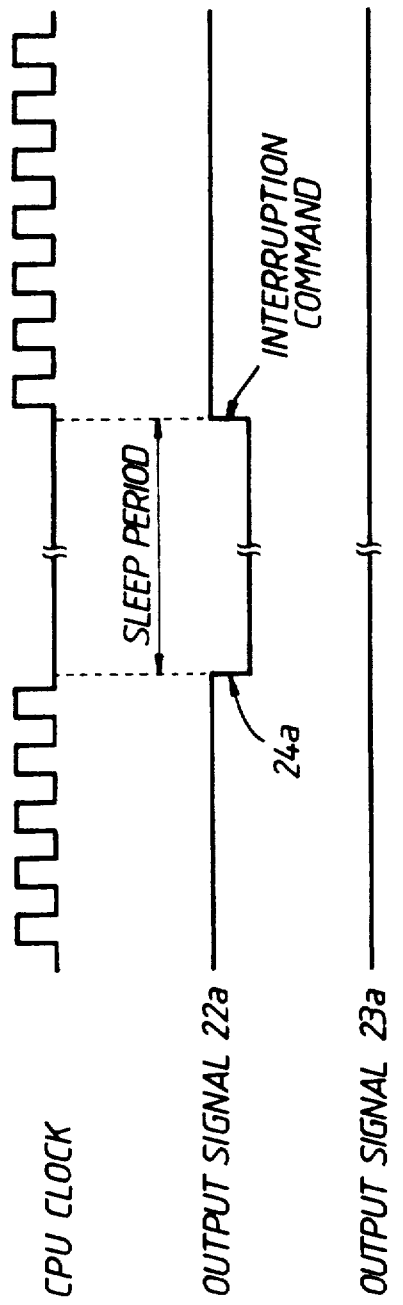
FIGS. 3(a) and 3(b) are timing diagrams for the timing control circuit 10 of FIG. 2(a)

In FIG. 2(a), dividing circuit 21 receives a basic clock signal from clock generator 9, and supplies a divided clock signal to CPU 1. A level of an output of interruption detection flip-flop flop 22 is normally high as shown in FIG. 3(a). When flip-flop 22 receives an output signal 24a from sleep control register 24, the level of flip-flop 22 is changed to a low level as shown in FIG. 3(a). Thereafter, when flip-flop 22 receives an interruption command from an input/output device, the level of flip-flop 22 is again restored to a high level as shown in FIG. 3(a).

Figure 3B:
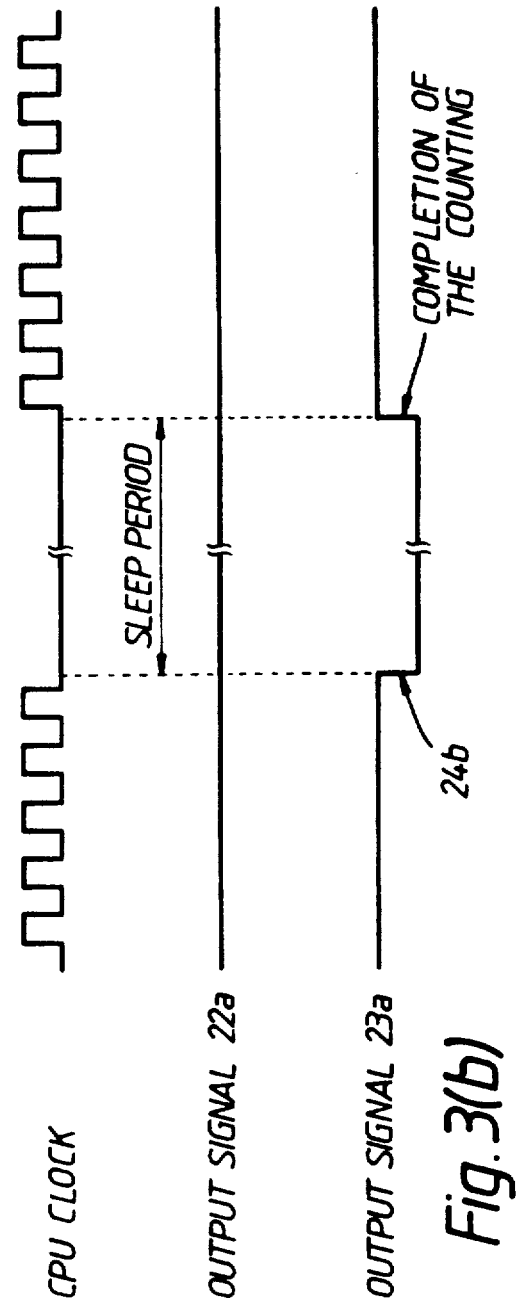

A level of an output of timer counter 23 is normally high as shown in FIG. 3(b). When timer counter 23 receives an output signal 24b from sleep control register 24, the level of timer counter 23 is changed to a low level as shown in FIG. 3(b), and counter 23 counts for a predetermined time period in accordance with the basic clock signal fed from clock generator 9. After the completion of the counting, the level of timer counter 23 is again restored to a high level as shown in FIG. 3(b).

Sleep control register 24 has a register to which interruption detection flip-flop 22 is responsive, and a register to which timer counter 23 is responsive. Sleep control register 24 receives a sleep command from CPU 1, and, based on the sleep command, sets the register for an input to interruption detection flip-flop 22 or the register for an input to timer counter 23. CPU 1 supplies two types of sleep commands; one commanding that the sleep state be continued until the generation of an interruption command from the input/output device, and the other commanding that the sleep state be maintained for a predetermined time period. In accordance with the former sleep command, sleep control register 24 sets the register for an input to interruption detection flip-flop 22. In accordance with the latter sleep command, sleep control register 24 sets the register for an input to timer counter 23. AND gate 25 receives output signals from dividing circuit 21, interruption detection flip-flop 22, and timer counter 23, to obtain a logical multiplication value. Since, normally, the levels of the output signals 22a and 23a of interruption detection flip-flop 22 and timer counter 23 are high, AND gate 25 outputs a CPU clock signal from dividing circuit 21. When the level of the output signal 22a or 23a of interruption detection flip-flop 22 or timer counter 23 is low, AND gate 25 stops outputting the CPU clock signal, so that CPU 1 is put in the sleep state. In this description, only the control of the CPU clock signal has been described. However, the clock signals of other peripheral circuits can be controlled similarly.

Figure 2B:
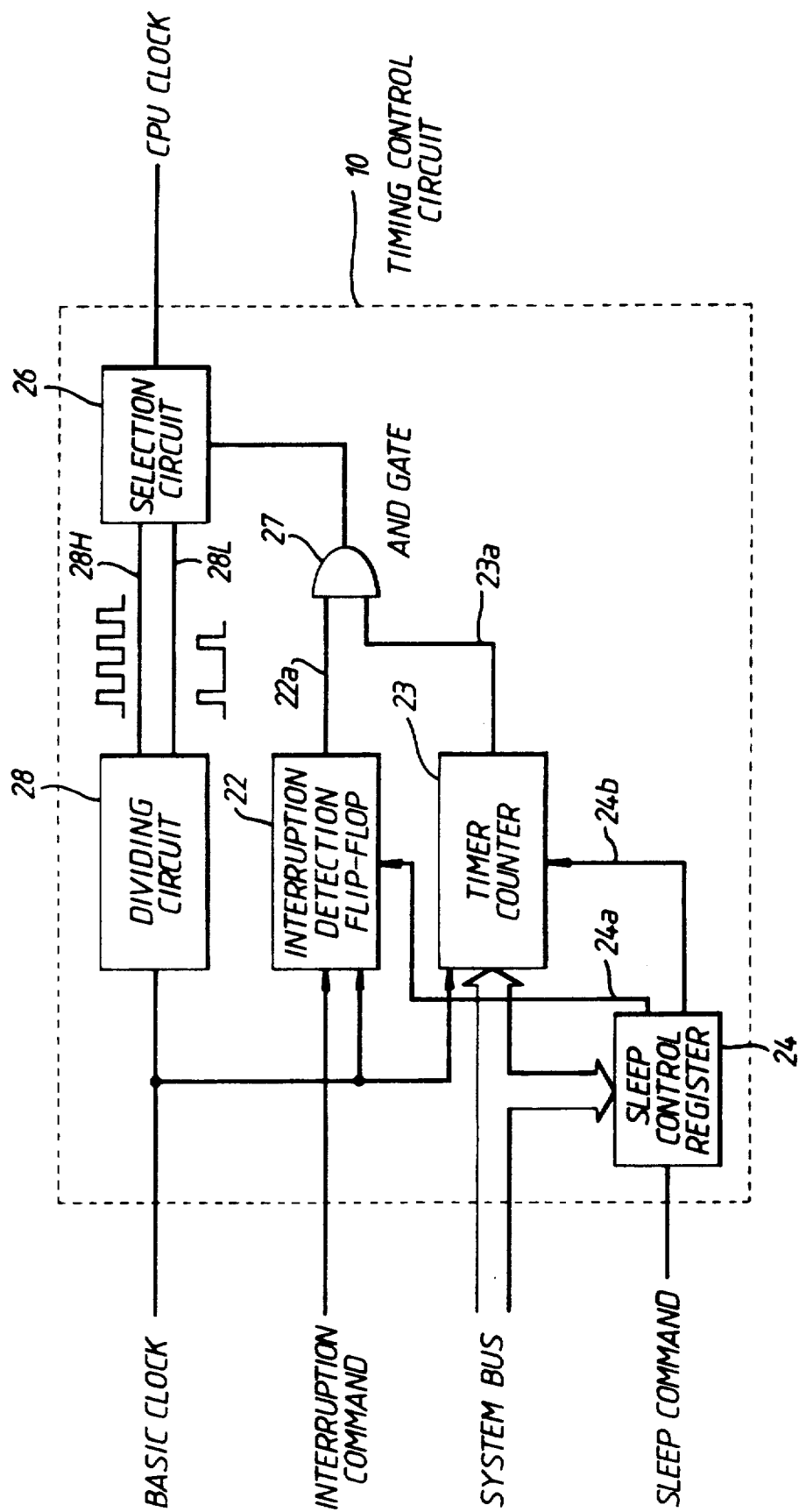

With reference to FIG. 2(a), a description was given of the case where the supply of the clock signal is stopped in the sleep mode. However, it is possible to save electric power by merely slowing the rate of the clock signal in the sleep mode. This case will now be described with reference to FIG. 2(b). In FIG. 2(b), the same blocks as are shown in FIG. 2(a) are accompanied with the same reference numerals, and the description thereof is omitted. Dividing circuit 28 divides the basic clock signal fed from clock generator 9 into a normal clock signal and a low-speed clock signal. The normal clock signal is fed to each device in the normal mode, and the low-speed clock signal is fed in the sleep mode. The normal clock signal and low-speed clock signal are supplied to selection circuit 26 through signal lines 28H and 28L. Based on an output from AND gate 27, selection circuit 26 outputs only one of the normal clock signal and the low-speed clock signal to CPU 1. When the output level of AND gate 27 is high, selection circuit 26 selects the normal clock signal fed through signal line 28H. When the output level of AND gate 27 is low, selection circuit 26 selects the low-speed clock signal fed through signal line 28L. The output level of AND gate 27 is low when the level of the output signal 22a or 23a of interruption detection flip-flop 22 or timer counter 23 is low. That is, when CPU 1 outputs a sleep mode command, selection circuit 26 selects the low-speed clock signal. Thus, the speed of the CPU clock is lowered as shown in FIGS. 4(a) and 4(b), and power consumption is reduced.

Figure 5:
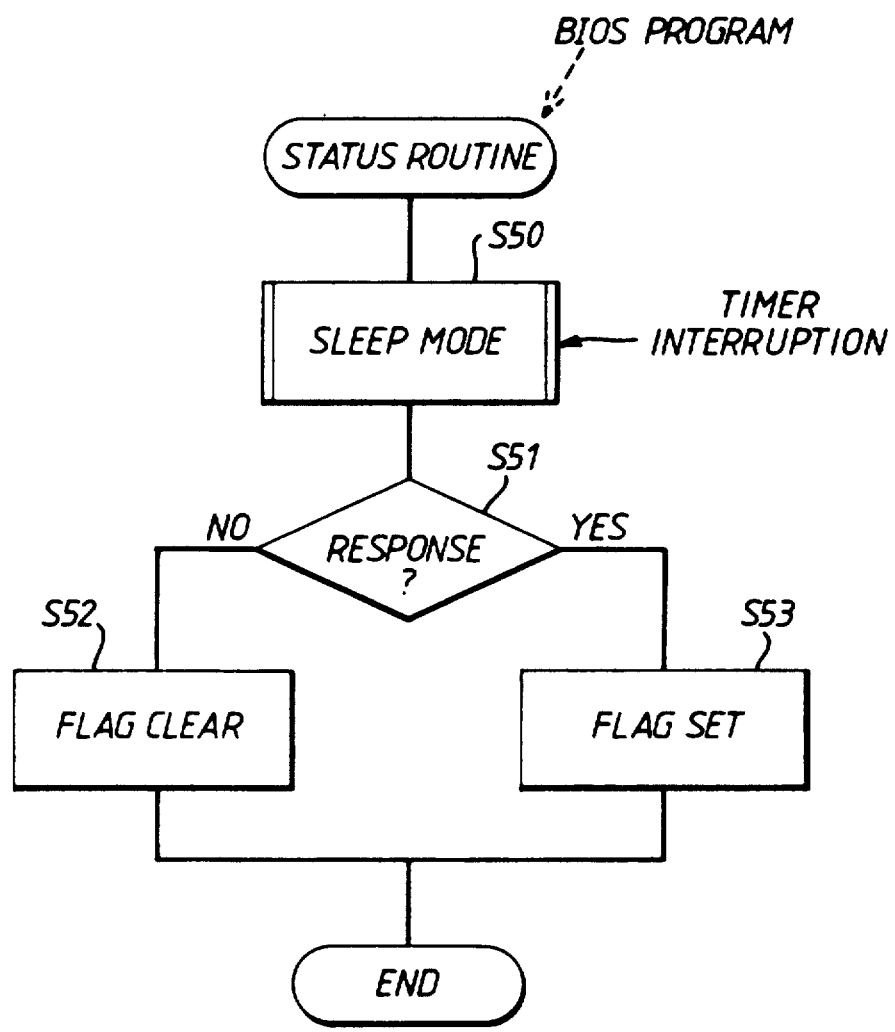
FIG. 5 is a flowchart showing a basic input/output service routine of the microcomputer system of FIG. 1.
Figure 6:
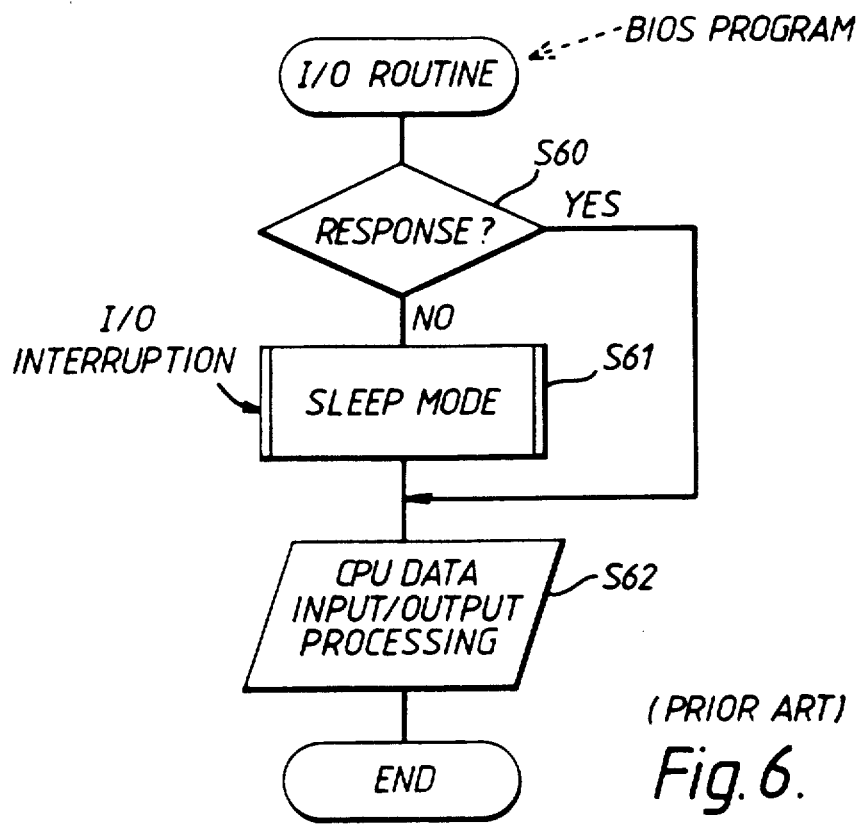
FIG. 6 is a flowchart showing a basic input/output service routine of a conventional microcomputer system.
Figure 7:
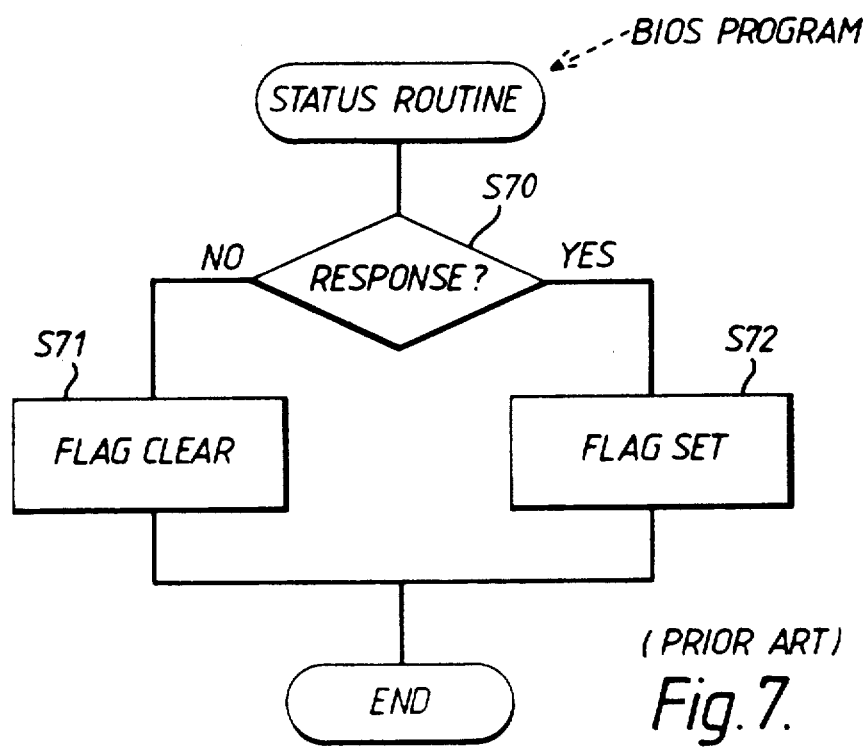
FIG. 7 is a flowchart showing routine for checking a response from an input/output device of a conventional microcomputer system.

FIG. 5 is a flowchart showing the basic input/output service (BIOS) status routine of the microcomputer system according to this embodiment. This status routine, along with the BIOS I/0 routine shown in FIG. 6, is stored in ROM 3 as a firmware program. The following is a description of how an operating system in accordance with the present embodiment executes the application program shown in FIG. 8(b).

Figure 8A:
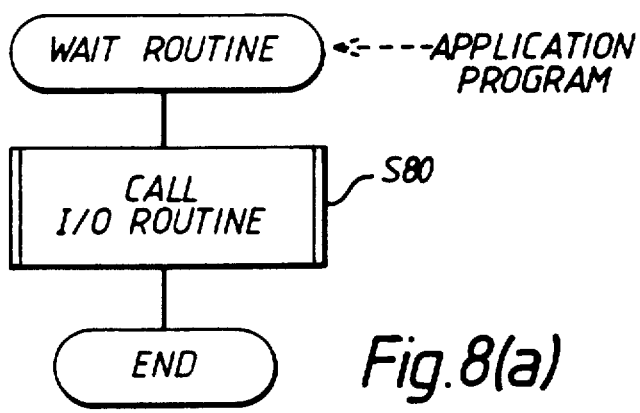
FIGS. 8(a) and 8(b) are flowcharts showing a process routine to be executed, while an application program is waiting a response from an input/output device.
Figure 8B:
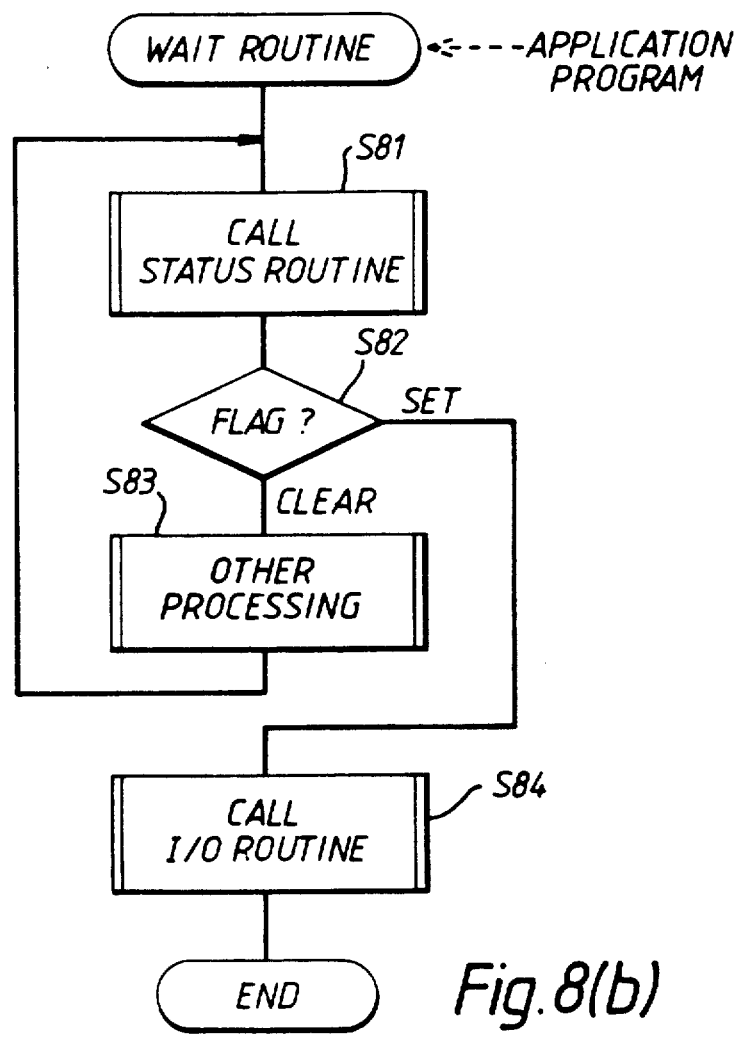

In FIG. 8(b), step 81 executes the operating system routine for checking the status of the input/output device, as shown in FIG. 5. Step 50 of FIG. 5 executes the sleep mode. CPU 1 supplies a sleep command to timing control circuit 10. This sleep command causes CPU 1 and its peripheral circuits to be kept in the sleep mode for a predetermined time period. Responding to the sleep command from CPU 1, timing control circuit 10 stops or at least slows the clock of CPU 1 and its peripheral circuits. Namely, timing control circuit 10 sets the register of CPU 1 for the input to timer counter 23 corresponding to sleep control register 24. The output signal 23a of timer counter 23 is thus set to a low level, so that the clock of CPU 1 and its peripheral circuits is stopped.

Timer counter 23 counts for a predetermined time period. Upon completion of counting, the output signal 23a of timer counter 23 is again set to a high level. By the timer interruption, CPU 1 clears the sleep mode in step 50. Then, in step 51, it is determined whether or not the input from the input/output device is present. If the input has been fed from the input/output device as determined in step 51, CPU 1 sets a predetermined flag at step 53. In the present embodiment, the flag is provided in an internal register of CPU 1. However, such a flag may be provided in RAM 2. In the absence of the input from the input/output device, the flag is cleared in step 52.

After the above-mentioned routine for checking the status is executed, the routine goes to step 82 in FIG. 8(b). Step 82 judges whether or not the flag is set. If the flag is cleared (meaning no input has been received, see steps 51 and 52, FIG. 5), other processing is performed in step 83. If the flag is set (meaning an input has been received, see steps 51 and 53, FIG. 5), as determined in step 82, the routine goes to step 84 for executing the basic input/output service routine of FIG. 6. The time period to be counted by timer counter 23 is suitably determined in consideration of the response speed of the input/output device, and the influence of a delay on processing.

As described above, in the present embodiment, the sleep mode is inserted at the top of the routine of FIG. 5 for checking the status. Thus, even if the application program of FIG. 8(b) is executed, the sleep mode is effectively used. The insertion of the sleep mode remarkably improves the power consumption of the system.

Also, the basic input/output service routine of the operating system shown in FIG. 6 may be used conventionally. In this case, even if the application program of FIG. 8(a) is executed in conjunction with the operating system I/0 routine of FIG. 6, the processing of the sleep mode is effectively utilized. In the sleep mode processing in step 61 of FIG. 6, timing control circuit 10 sets the register within sleep control register 24 for the input to interruption detection flip-flop 22. Consequently, the output signal 22a of interrupt detection flip-flop 22 is set to the low level, and the clock of CPU 1 and its peripheral circuits is stopped. Thereafter, when interruption detection flip-flop 22 receives an interruption command from the input/output device, the output signal 22a of flip-flop 22 is again set to the high level. Thus, CPU 1 completes the sleep mode of step 61.

As an example, suppose CPU 1 is waiting for an input from a keyboard connected to input/output controller 6. Generally, the input response speed of the keyboard is several tens of millisecond (mS) at the highest. Therefore, even if a sleep mode of several mS is inserted in the waiting time, the performance of the system is little affected. In addition, if other processing is inserted during the waiting time, processing speed is not that important in most cases; therefore, there is no problem. Here, the input processing of the keyboard has been mentioned. The sleep mode is applicable to any lower-processing-speed devices such as printers or input/output devices using magnetic media.

What is claimed is:

1. A computer system having at least one associated input/output device, comprising:
   processing means, responsive to clock signals, for detecting an activity with an input/output device which indicates a time period for waiting for a response from the input/output device and for producing a sleep mode execution command indicative thereof; and
   timing control means for executing a sleep mode during which a rate of said clock signals for said processing means is changed, said sleep mode being executed for a predetermined time in response to said sleep mode execution command,
   said processing means also checking whether or not the response from the input/output device exists, after said timing control means complete executing the sleep mode.

2. The microcomputer system of claim 1, wherein said system includes peripheral circuits coupled to said processing means and said timing control means includes:
   means for providing a basic clock signal, and for supplying predetermined clock signals related to said basic clock signal, to said processing means and said peripheral circuits; and
   means for suspending said clock signals by said providing means for a predetermined time period, in response to said sleep mode execution command.

3. The microcomputer system of claim 2, wherein said suspending means includes means for restarting the supply of said clock signals after said predetermined time period.

4. The microcomputer system of claim 1, further comprising means for retaining information as to whether or not a response from the input/output device exists, said processing means checking whether or not a response from the input/output device exists after the completion of the sleep mode by said timing control means, wherein, in the presence of the response, said processing means causes said retaining means to retain the information as to the presence of the response, and in the absence of the response, said processing means clears the information stored in said retaining means.

5. The microcomputer system of claim 4, wherein said retaining means includes a memory accessible by said processing means.

6. The microcomputer system of claim 1, wherein said system includes peripheral circuits coupled to said processing means and said timing control means includes:
   control means for 1) executing, based on said sleep mode execution command, said sleep mode in which rates of clock signals for said processing means and said peripheral circuits are changed, and 2) generating a counting command; and
   means for counting for said predetermined time period, in response to said counting command from said control means, and outputting an interruption signal to said control means after the lapse of said predetermined time period,
   wherein said control means finishes the sleep mode when it receives the interruption signal from said counting means.

7. The microcomputer system of claim 1, wherein said system includes peripheral circuits coupled to said processing means and said timing control means includes:

means for dividing a basic clock signal into a normal clock signal and a low-speed clock signal; and selection means for receiving said normal clock signal and said low-speed clock signal from said dividing means, and supplying said low-speed clock signal to said processing means and said peripheral circuits during said sleep mode, and supplying said normal clock signal at other times.

8. The microcomputer system of claim 1, wherein said system includes peripheral circuits coupled to said processing means and said timing control means includes:

clock generating means for supplying a basic clock signal;

means for dividing said basic clock signal from said clock generating means into a normal clock signal and a low-speed clock signal;

selection means for receiving said normal clock signal and a low-speed clock signal from said dividing means, and supplying a selected one of said normal clock signal and said low-speed clock signal to said processing means and said peripheral circuits; and counting means for outputting a clock change command, in response to said sleep mode execution command, and outputting an interruption signal for cancelling said clock change command, after a predetermined time period is counted by said counting means, wherein said selection means selects said low-speed clock signal in response to said clock change command from said counting means and said normal clock signal after said interruption signal from said counting means.

9. The microcomputer system of claim 8, wherein said timing control means also includes instructing means for instructing said counting means to count for said predetermined time period, in response to said sleep mode execution command.

10. The microcomputer system of claim 1, wherein said timing control means prevents said clock signals from being applied to said processing means during said sleep mode.

11. A microcomputer system comprising:

a CPU which detects an activity with an input/output device that indicates a time period for waiting for a response for the input/output device and for outputting a sleep mode execution command indicative thereof;

peripheral devices connected to said CPU;

a clock generator for supplying a basic clock signal;

dividing means for dividing said basic clock signal from said clock generator into clock signals for said CPU and said peripheral devices, and supplying said clock signals to said CPU and said peripheral devices;

instructing means for generating a counting command, in accordance with said sleep mode execution command from said CPU;

counting means for counting clock pulses while said counting command is output, and for outputting a clock suspension command, in response to said counting command, and outputting an interruption signal for cancelling said clock suspension command, after a predetermined time period is determined by said clock pulses which are counted; and clock suspension means, receiving said clock suspension command from said counting means, for suspending the dividing by said dividing means to suspend the supply of said clock signals from said dividing means when said clock suspension command is received, and resuming the dividing by said dividing means to resume the supply of said clock signals from said dividing means, when said interruption signal is received from said counting means.

12. The microcomputer system of claim 11, further comprising retaining means for retaining information as to whether or not a response from the input/output device exists, said CPU checking whether or not a response from the input/output device exists after the completion of the sleep mode, wherein, in the presence of the response, the CPU causes said retaining means to retain the information as to the presence of the response, and in the absence of the response, the CPU clears the information stored in the retaining means.

13. The microcomputer system of claim 11, wherein said retaining means includes a memory accessible by said CPU.

14. A microcomputer system comprising:

a CPU for detecting a time period for waiting for a response from an input/output device and for outputting a selected one of a first sleep mode execution command and a second sleep mode execution command when said time period occurs, said CPU outputting said first sleep mode execution command when a sleep state is to be kept until the response from the input/output device is made, and said CPU outputting said second sleep mode execution command when the sleep state is to be kept for a predetermined time period;

peripheral devices connected to said CPU;

a clock generator for supplying a basic clock signal;

dividing means for dividing said basic clock signal from said clock generator into clock signals for said CPU and said peripheral devices, and supplying said clock signal to said CPU and said peripheral devices;

instructing means for generating a sleep command in accordance with said first sleep mode execution command from said CPU, and for generating a counting command in accordance with said second sleep mode execution command from said CPU;

interruption detection means, coupled to the input/output device to receive an indication of a response therefrom, for outputting a first clock suspension command, in response to said sleep command, and for outputting a first interruption signal for cancelling the first clock suspension command, when the indication indicative of a response is received from the input/output device, indicating a response has been made;

counting means for counting clock pulses while said counting command is output, and for outputting a second clock suspension command in response to said counting command, and for outputting a second interruption signal for cancelling the second clock suspension command after a predetermined time period, which is determined by said clock pulses which are counted; and clock suspension means for;

a) suspending the dividing by said dividing means to thereby suspend said clock signals from said dividing means when said clock suspension means receives said first clock suspension command from said interruption detection means, and enabling said dividing means to resume the supply of said clock signals when said clock suspension means receives said first interruption signal from said interruption detection means, and for b) suspending the dividing by said dividing means to thereby suspend said clock signals from said dividing means when said clock suspension means receives said second clock suspension command from said counting means, and enabling said dividing means to resume the supply of said clock signals when said clock suspension means receives said second interruption signal from said counting means.

15. The microcomputer system of claim 14, further comprising retaining means for retaining information as to whether or not a response from the input/output device exists, said CPU checking whether or not a response from the input/output device exists after the completion of the sleep mode by said counting means and said clock suspension means, wherein, in the presence of the response, the CPU causes said retaining means to retain the information as to the presence of the response, and in the absence of the response, the CPU clears the information stored in the retaining means.

16. The microcomputer system of claim 14, wherein said retaining means includes a memory accessible by said CPU.

* * * * *